US009864539B1

(12) United States Patent
Tylik et al.

(10) Patent No.: US 9,864,539 B1
(45) Date of Patent: Jan. 9, 2018

(54) EFFICIENT PROVISIONING OF VIRTUAL DEVICES BASED ON A POLICY

(71) Applicant: EMC IP Holding Company LLC, Hopkinton, MA (US)

(72) Inventors: Dmitry Tylik, Westborough, MA (US); Alexey Vladimirovich Shusharin, Saint Petersburg (RU); Sergey Alexandrovich Alexeev, Saint Petersburg (RU); Sergey Chernov, Saint Petersburg (RU); Ekaterina Konstantinovna Sigalova, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/872,010

(22) Filed: Sep. 30, 2015

(51) Int. Cl.
*G06F 3/00* (2006.01)
*G06F 13/12* (2006.01)
*G06F 13/00* (2006.01)
*G06F 3/06* (2006.01)

(52) U.S. Cl.
CPC .......... *G06F 3/0631* (2013.01); *G06F 3/0608* (2013.01); *G06F 3/0664* (2013.01); *G06F 3/0689* (2013.01)

(58) Field of Classification Search
CPC ............. G06F 17/30091; G06F 3/0605; G06F 3/0608; G06F 3/0631; G06F 12/0684; G06F 12/02; G06F 3/0655
USPC ............ 710/74, 8, 14, 62, 72; 711/114, 117, 711/170, 172; 707/693
See application file for complete search history.

(56) References Cited

U.S. PATENT DOCUMENTS

| 2013/0297907 A1* | 11/2013 | Ki ....................... G06F 12/0684 711/170 |
| 2014/0052953 A1* | 2/2014 | Ben-Tsion ............ G06F 3/0605 711/172 |
| 2014/0075111 A1* | 3/2014 | Pike ...................... G06F 3/0665 711/114 |
| 2014/0089921 A1* | 3/2014 | Yang ................... G06F 9/45558 718/1 |
| 2014/0258670 A1* | 9/2014 | Venkatasubramanian ............................ G06F 12/023 711/171 |

(Continued)

*Primary Examiner* — Farley Abad
*Assistant Examiner* — Henry Yu
(74) *Attorney, Agent, or Firm* — BainwoodHuang (57) ABSTRACT

Systems and method are disclosed for provisioning storage for a logical storage device. At least one storage capability profile is provided. A request to provision the storage for the logical storage device is received. A plurality of candidate storage resource configurations are determine based on the at least one storage capability profile and the storage policy profile, where a first candidate storage resource configuration specifies thick provisioning in a first storage pool and a second candidate storage resource configuration specifies thin provisioning in the first storage pool. A ranking of the plurality of candidate storage resource configurations is provided, the ranking indicating the first candidate storage resource configuration has a higher priority than the second candidate storage resource configuration. It is determined that the first storage pool has insufficient storage for thick provisioning. The storage of the logical device is provisioned in accordance with the second candidate storage configuration.

17 Claims, 5 Drawing Sheets

(56) References Cited

U.S. PATENT DOCUMENTS

| | | | |
|---|---|---|---|
| 2014/0279966 A1* | 9/2014 | Rajpal | G06F 17/30091 707/693 |
| 2014/0281227 A1* | 9/2014 | Herron | G06F 12/02 711/117 |
| 2015/0134903 A1* | 5/2015 | Goodman | G06F 3/0655 711/114 |

* cited by examiner

EFFICIENT PROVISIONING OF VIRTUAL DEVICES BASED ON A POLICY

CROSS-REFERENCE TO APPLICATION

The contents of U.S. application Ser. No. 14/646,422, titled "POLICY BASED PROVISIONING OF STORAGE SYSTEM RESOURCES," and filed May 21, 2015 are hereby incorporated in their entirety.

FIELD OF THE TECHNOLOGY

The present technology relates generally to data storage systems and, more specifically, to efficient provisioning of virtual devices in storage systems.

BACKGROUND

In some applications, a storage system can provide storage to a virtual machine ("VM") running in a virtualization environment on a host system connected to the storage system. Examples of such storage systems include the storage systems produced by EMC Corporation of Massachusetts. The storage system can make a logical storage device (e.g., a virtual volume) available to the VM, such that the VM can read data from and write data to the logical storage device. The VM can use the logical storage device as, for example, a configuration device, a swap device, or a data device. The storage for the logical storage device can be provisioned from one or more of the physical storage devices (e.g., magnetic disk drives, solid state drives ("SSDs"), etc.) of the storage system, and the storage system can manage on which physical storage devices data from the logical storage device are stored in a manner transparent to the VM. Conventional approaches to provisioning storage for logical storage devices can lead to inefficient resource utilization or failure to provision any space for the logical storage device.

SUMMARY OF THE TECHNOLOGY

Accordingly, there is a need for efficient provisioning of storage for logical storage devices. In one aspect, there is a data storage system-implemented method of provisioning storage for a logical storage device. The method includes providing, by the storage system, at least one storage capability profile, each storage capability profile of the at least one storage capability profile specifying one or more supported storage resource configurations supported by a storage pool in the storage system. The method includes receiving, by the storage system, a request to provision the storage for the logical storage device, the request comprising a storage policy profile specifying one or more requested storage resource configurations for the logical device. The method includes determining, by the storage system, a plurality of candidate storage resource configurations based on the at least one storage capability profile and the storage policy profile, wherein a first candidate storage resource configuration of the plurality of candidate storage resource configurations specifies thick provisioning in a first storage pool and a second candidate storage resource configuration specifies thin provisioning in the first storage pool. The method includes providing, by the storage system, a ranking of the plurality of candidate storage resource configurations, the ranking indicating the first candidate storage resource configuration has a higher priority than the second candidate storage resource configuration. The method includes determining, by the storage system, the first storage pool has insufficient storage for thick provisioning the storage of the logical storage device. The method includes provisioning, by the storage system, the storage of the logical device in accordance with the second candidate storage configuration.

In some embodiments, each candidate storage resource configuration of the plurality of candidate storage resource configurations comprises a plurality of capabilities and associated capability values. In some embodiments, the plurality of capabilities comprises at least one of flash-based storage, drive type, RAID type, fast cache, fast VP, and space efficiency. In some embodiments, each candidate storage resource configuration of the plurality of candidate storage resource configurations comprises a space efficiency capability and an associated capability value, wherein the associated capability value is thick provisioning or thin provisioning. In some embodiments, determining the first storage pool has insufficient storage for thick provisioning the storage of the logical storage device includes initiating, by the storage system, provisioning the storage of the logical device in accordance with the first candidate storage configuration; and determining, by the storage system, provisioning the storage of the logical device in accordance with the first candidate storage configuration fails. In some embodiments, the logical storage device is one of a configuration device, a swap device, or a data device used by a virtual machine.

In another aspect, there is a data storage system-implemented method of provisioning storage for a logical storage device. The method includes providing, by the storage system, a plurality of storage capability profiles, each storage capability profile of the plurality of storage capability profiles specifying one or more supported storage resource configurations supported by a storage pool in the storage system. The method includes receiving, by the storage system, a request to provision the storage for the logical storage device, the request comprising a storage policy profile specifying one or more requested storage resource configurations for the logical device. The method includes determining, by the storage system, a plurality of candidate storage resource configurations based on the plurality of storage capability profiles and the storage policy profile, wherein a first candidate storage resource configuration of the plurality of candidate storage resource configurations specifies provisioning in a first storage pool and a second candidate storage resource configuration of the plurality of candidate storage resource configurations specifies provisioning in a second storage pool. The method includes providing, by the storage system, a ranking of the plurality of candidate storage resource configurations, the ranking indicating the first candidate storage resource configuration has the same priority as the second candidate storage resource configuration. The method includes selecting, by the storage system, a selected storage resource configuration of the first candidate storage resource configuration and the second candidate storage resource configuration based on comparing a first utilization of the first storage pool to a second utilization of the second storage pool. The method includes provisioning, by the storage system, the storage of the logical device in accordance with the selected storage resource configuration.

In some embodiments, each candidate storage resource configuration of the plurality of candidate storage resource configurations comprises a plurality of capabilities and associated capability values. In some embodiments, the plurality of capabilities comprises at least one of flash-based storage, drive type, RAID type, fast cache, fast VP, and space efficiency. In some embodiments, the plurality of capabilities and associated capability values of the first candidate storage resource configuration are the same as the plurality of capabilities and associated capability values of the second candidate storage resource configuration.

In some embodiments, selecting the selected storage resource configuration of the first candidate storage resource configuration and the second candidate storage resource configuration based on comparing a first utilization of the first storage pool to a second utilization of the second storage pool includes determining, by the storage system, a first available space in the first storage pool; determining, by the storage system, a second available space in the second storage pool; selecting, by the storage system, the first candidate storage resource configuration if the first available space is greater than the second available space; and selecting, by the storage system, the second candidate storage resource configuration if the first available space is not greater than the second available space.

In some embodiments, selecting the selected storage resource configuration of the first candidate storage resource configuration and the second candidate storage resource configuration based on comparing a first utilization of the first storage pool to a second utilization of the second storage pool includes determining, by the storage system, a first I/O load for the first storage pool; determining, by the storage system, a second I/O load for the second storage pool; selecting, by the storage system, the first candidate storage resource configuration if the first I/O load is less than the second I/O load; and selecting, by the storage system, the second candidate storage resource configuration if the first I/O load is not less than the second I/O load.

In some embodiments, selecting the selected storage resource configuration of the first candidate storage resource configuration and the second candidate storage resource configuration based on comparing a first utilization of the first storage pool to a second utilization of the second storage pool includes determining, by the storage system, the first utilization based on a first available space in the first storage pool and a first I/O load for the first storage pool; determining, by the storage system, the second utilization based on a second available space in the second storage pool and a second I/O load for the second storage pool; selecting, by the storage system, the first candidate storage resource configuration if the first utilization is less than the second utilization; and selecting, by the storage system, the second candidate storage resource configuration if the first utilization is not less than the second utilization. In some embodiments, the logical storage device is one of a configuration device, a swap device, or a data device used by a virtual machine.

In another aspect, there is a data storage system-implemented method of provisioning storage for a logical storage device. The method includes providing, by the storage system, a plurality of storage capability profiles, each storage capability profile of the plurality of storage capability profiles specifying one or more supported storage resource configurations supported by a storage pool in the storage system. The method includes receiving, by the storage system, a request to provision storage for the logical storage device, the request comprising a storage policy profile specifying one or more requested storage resource configurations for the logical device. The method includes determining, by the storage system, a plurality of candidate storage resource configurations based on the plurality of storage capability profiles and the storage policy profile, wherein a first candidate storage resource configuration of the plurality of candidate storage resource configurations specifies provisioning in a first storage pool and a second candidate storage resource configuration of the plurality of candidate storage resource configurations specifies provisioning in a second storage pool. The method includes providing, by the storage system, a ranking of the plurality of candidate storage resource configurations, the ranking indicating a first candidate storage resource configuration has a higher priority than a second candidate storage resource configuration. The method includes determining, by the storage system, the first storage pool has insufficient storage for provisioning the storage of the logical storage device in accordance with the first candidate storage configuration. The method includes provisioning, by the storage system, the storage of the logical device in accordance with the second candidate storage configuration.

In some embodiments, each candidate storage resource configuration of the plurality of candidate storage resource configurations comprises a plurality of capabilities and associated capability values. In some embodiments, the plurality of capabilities comprises at least one of flash-based storage, drive type, RAID type, fast cache, fast VP, and space efficiency. In some embodiments, at least one of the plurality of capabilities and associated capability values of the first candidate storage resource configuration is different than at least one of the plurality of capabilities and associated capability values of the second candidate storage resource configuration. In some embodiments, determining the first storage pool has insufficient storage for provisioning the storage of the logical storage device in accordance with the first candidate storage configuration includes initiating, by the storage system, provisioning the storage of the logical device in accordance with the first candidate storage configuration; and determining, by the storage system, provisioning the storage of the logical device in accordance with the first candidate storage configuration fails. In some embodiments, the logical storage device is one of a configuration device, a swap device, or a data device used by a virtual machine.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

In order to facilitate integration with virtualization environments and/or hypervisors (e.g., vSphere from VMware or Hyper-V from Microsoft), an API can be provided that permits specifying to a storage system the capabilities of the storage used to provide a logical storage device. In some applications, at the time the creation of a logical storage device (e.g., virtual volume) is requested, a storage policy profile can be provided to the storage system via the API to specify the desired capabilities of the storage used to provide the logical storage device. The storage system can provision storage for the logical storage device in accordance with storage policy profile provided from the virtualization environment. The technology described herein can facilitate efficient provisioning of storage for a logical storage device based on, e.g., a storage policy profile and the capabilities of the storage system.

Exemplary Storage System Environment

Figure 1:
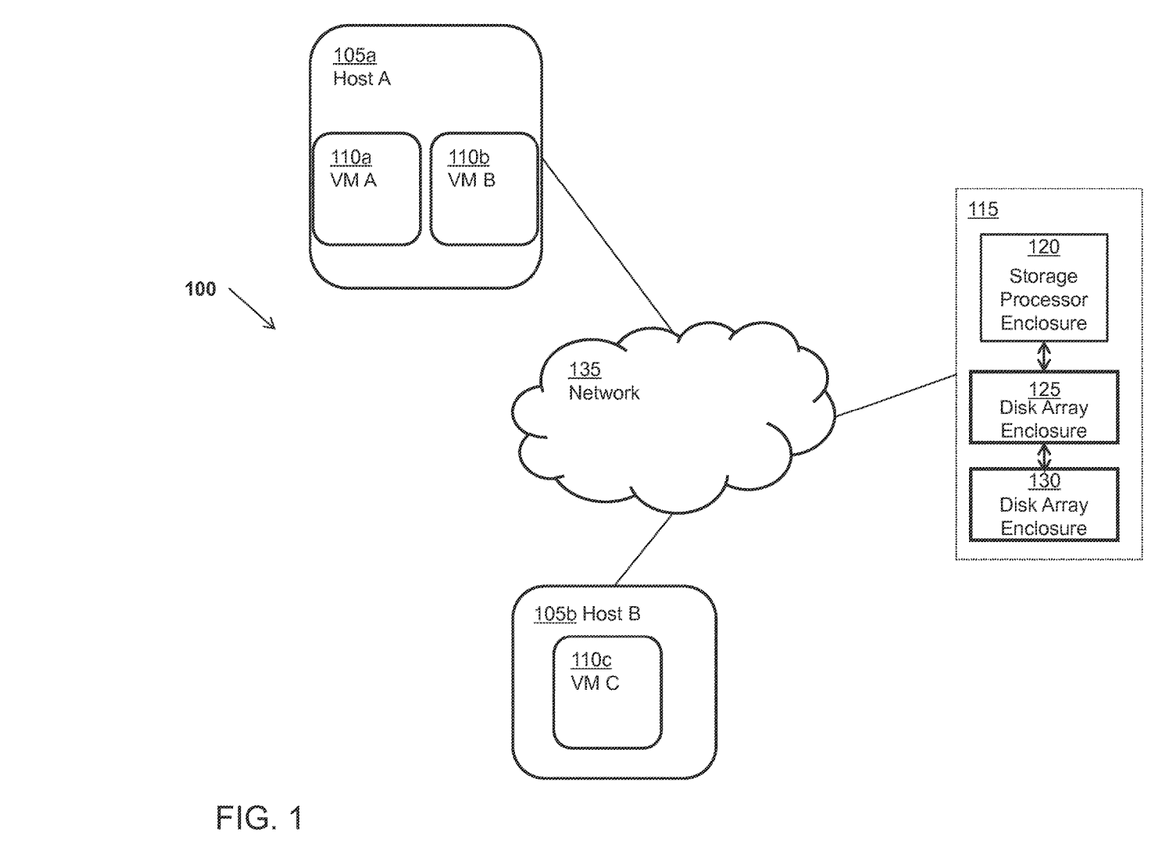
FIG. 1 depicts a system in which the technology can be implemented.

FIG. 1 depicts system 100 in which the technology can be implemented. System 100 includes host 105a and host 105b. Host 105a can be a computing device on which VM 110a and VM 110b are executing in a virtual environment. Host 105b can be a computing device on which VM 110c is executing in a virtual environment. Storage system 115 includes storage processor enclosure 120. Storage processor enclosure 120 can include one or more storage processors (not shown). The storage processors can be any computing devices, such as servers, blade servers, etc. Storage system 115 includes disk array enclosure 125 and disk array enclosure 130. Disk array enclosures 125 and 130 can include any form of storage devices, such as magnetic disk drives, flash memory drives, SSDs, etc. In the illustrated embodiment, storage processor enclosure 120 is connected to disk array enclosure 125, which is connected to disk array enclosure 130. The storage processors can read data from and write data to the storage devices in disk array enclosure 125 and disk array enclosure 130. Host 105a and host 105b can be connected to storage system 115 via network 135. The illustrated connections can each be any type of connection for communicating data. In general, the storage processors in storage processor enclosure 120 service I/O requests (e.g., commands to read data from or write data to storage system 115) received from host 105a and host 105b (or VMs executing thereon).

It should be appreciated that system 100 is an exemplary system in accordance with the technology. Other configurations are contemplated. For example, in some embodiments, the storage processors and disk enclosures can be in the same or different enclosures. In some embodiments, more or fewer disk array enclosures can be connected to the storage processors in the storage processor enclosure.

Figure 2:
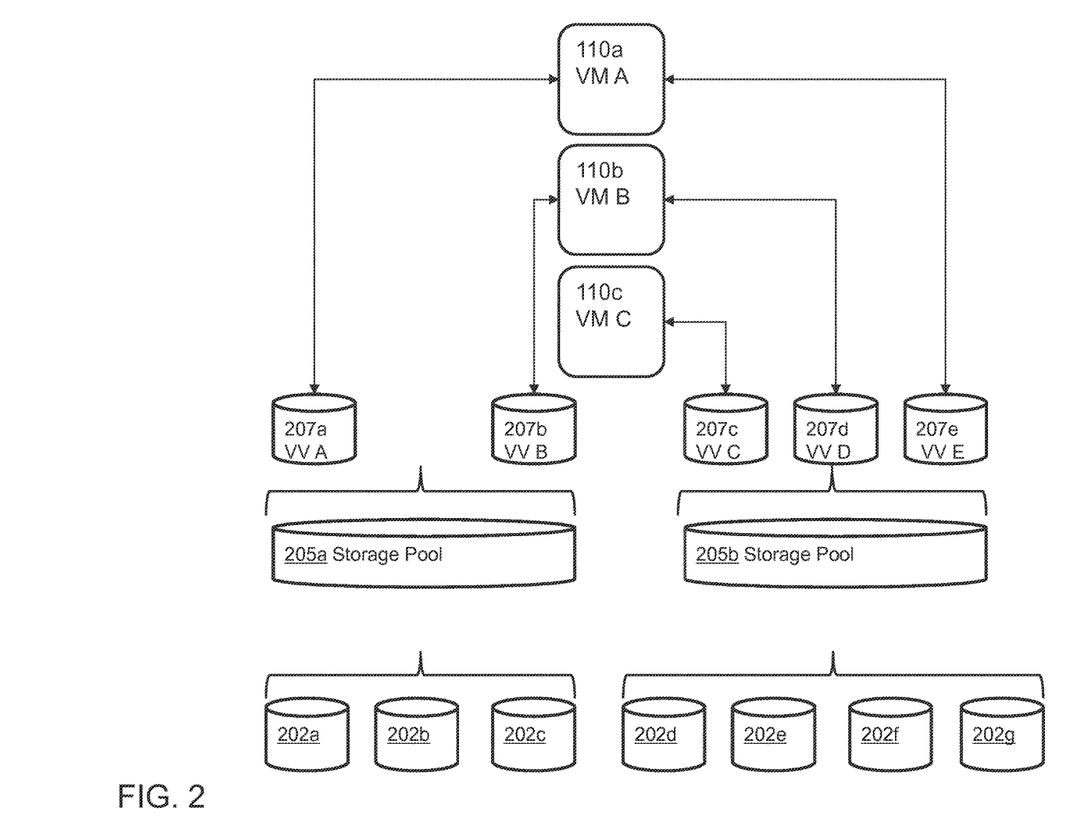
FIG. 2 depicts exemplary logical relationships between hardware in a storage system and logical storage system objects, including logical devices.

As described herein, storage system 115 can provide logical storage devices to VM 110a, VM 110b, and VM 110c, such that VM 110a, VM 110b, and VM 110c can write data to and read data from the logical devices. FIG. 2 depicts exemplary logical relationships between hardware in storage system 115 and logical storage system objects, including logical devices. Storage system 115 can include one or more physical storage devices 202a-202g (e.g., SSDs or magnetic disk drives). Storage system 115 can include one or more logical storage system objects, including storage pools 205a and 205b, and Virtual volumes 207a-207e. The illustrated logical relationships can be used to provide logical storage devices to VM 110a-110c. For example, storage devices 202a-202c can be located in disk array enclosure 125. Storage system 115 can include hardware, firmware, and/or software to implement the illustrated logical relationships. As illustrated in FIG. 2, storage pool 205a can be formed from hardware storage devices 202a-202c (e.g., physical storage devices). For example, the storage space of one or more of hardware storage devices 202a-202c can be added to storage pool 205a, making the storage space from one or more of hardware storage devices 202a-202c available to be provisioned from storage pool 205a. Virtual volumes 207a and 207b can be formed on storage pool 205a. For example, a portion of the storage space from storage pool 205a (which in turn is physical storage space from one or more of hardware storage devices 202a-202c) can be provisioned and/or assigned to virtual volume A 207a and a portion of the storage space from storage pool 205a (which in turn is storage space from one or more of hardware storage devices 202a-202c) can be provisioned and/or assigned to virtual volume B 207b. Virtual volumes 207c-207e can be similarly provisioned from storage pool 205b (which in turn is storage space from one or more of hardware storage devices 202d-202g). In some embodiments, allocations or portions of storage pools can be grouped into a storage container. For example, a storage container can include storage from one or more storage containers. In some embodiments, virtual volumes can be provisioned from the storage containers.

Virtual volumes 207a-207e are logical storage devices that can be used by VMs 110a-110c for data storage and retrieval. Storage system 115 can maintain logical mappings between the address spaces of virtual volumes 207a-207e and storage devices 202a-202g. In some embodiments, provisioning storage space in a storage pool for a virtual volume can include creating the mapping between the virtual volume's address space and the storage pool's address space. As an example of the operation of storage system 115 providing the illustrated logical arrangement, if VM A 110a writes data to virtual volume A 207a to be stored at a logical address on virtual volume A 207a, the data can be stored on portions of hardware storage devices 202a-202c that are assigned to virtual volume A 207a via storage pool 205a and mapped to the logical address. As another example, if VM A 110a reads data from virtual volume E 207e from a logical address on virtual volume E 207e, the data can be read from portions of hardware storage devices 202d-202g that are assigned to virtual volume E 207e via storage pool 205b and mapped to the logical address. VM B 110b can similarly access virtual volume B 207b and virtual volume D 207d. VM C 110c can similarly access virtual volume C 207c.

It should be appreciated that logical relationships illustrated in FIG. 2 are exemplary logical relationships in accordance with the technology. Other relationships are contemplated. For example, one or more additional layers of virtualization and/or abstraction can be utilized by a storage system in providing logical storage devices. In some storage systems, a virtual volume can be referred to as a logical volume and/or logical disk volume.

Storage Profiles

As discussed above, a storage system can provision physical storage space from physical storage devices for use in a logical device (e.g., a virtual volume). A storage policy profile can be provided to a storage system via an API to specify the capabilities desired for the storage provisioned for the logical device. For example, the storage policy profile may specify the type of storage device (e.g., magnetic hard drive, SSD, NL-SAS, SAS, etc.) or storage tier from which storage is provisioned for the logical device, the RAID type, whether automated storage tiering is enabled, whether FAST cache is enabled for storing data of the logical device, whether the virtual volume can be a thick or thin logical storage device, a service level (e.g., average latency, and/or IO operation density), etc. These capabilities are described in more detail in U.S. application Ser. No.

14/646,422, titled "POLICY BASED PROVISIONING OF STORAGE SYSTEM RESOURCES," and filed May 21, 2015, the contents of which are hereby incorporated by reference. More generally, a storage policy profile can specify any requested capabilities of the storage or storage system resources provisioned for the logical device.

A storage system can provide a storage capability profile that specifies the capabilities of the data storage available for provisioning storage for a virtual volume. In some embodiments, a storage system can provide one or more storage capability profiles. For example, a storage system can provide a storage capability profile for each storage pool (e.g., storage pool 205a or storage pool 205b). A storage system can provide more than one storage capability profile for a storage container (e.g., a storage capability profile for each storage pool with an allocation in the storage container).

In some embodiments, a storage policy profile or a storage capability profile can specify one or more capabilities, each with associated constraints. A capability can be a characteristic of the storage and the associated constraints can be a set of values that would be acceptable (e.g., in the case of a storage policy profile) or a set of values that indicate what the storage system supports (e.g., in the case of a storage capability profile) for that capability. For example, the capabilities can include flash-based storage, drive type, RAID type, fast cache, fast VP, and space efficiency. As an example, the possible constraints for "flash-based storage" can be "yes" or "no" to indicate whether flash-based storage (e.g., SSDs) is requested or supported. As another example, the possible constraints for "space efficiency" can be "thick" and/or "thin" to indicate whether thick provisioned logical devices, thin provisioned logical devices, or either one are requested or supported. For example, a storage policy profile can specify that for RAID level (e.g., capability) RAID 5 or RAID 6 (e.g., constraints) are acceptable for a requested logical device. As another example, a storage capability profile can specify that for RAID level (e.g., capability) RAID 6 (e.g., constraint) is supported for a particular storage pool. A set of capabilities and a specified option for each capability can be referred to as a storage resource configuration. More generally, a storage policy profile can specify one or more storage resource configurations requested for the virtual volumes and the storage capability profile can specify one or more storage resource configurations supported by a storage pool.

Efficient Provisioning of Storage

Figure 3:
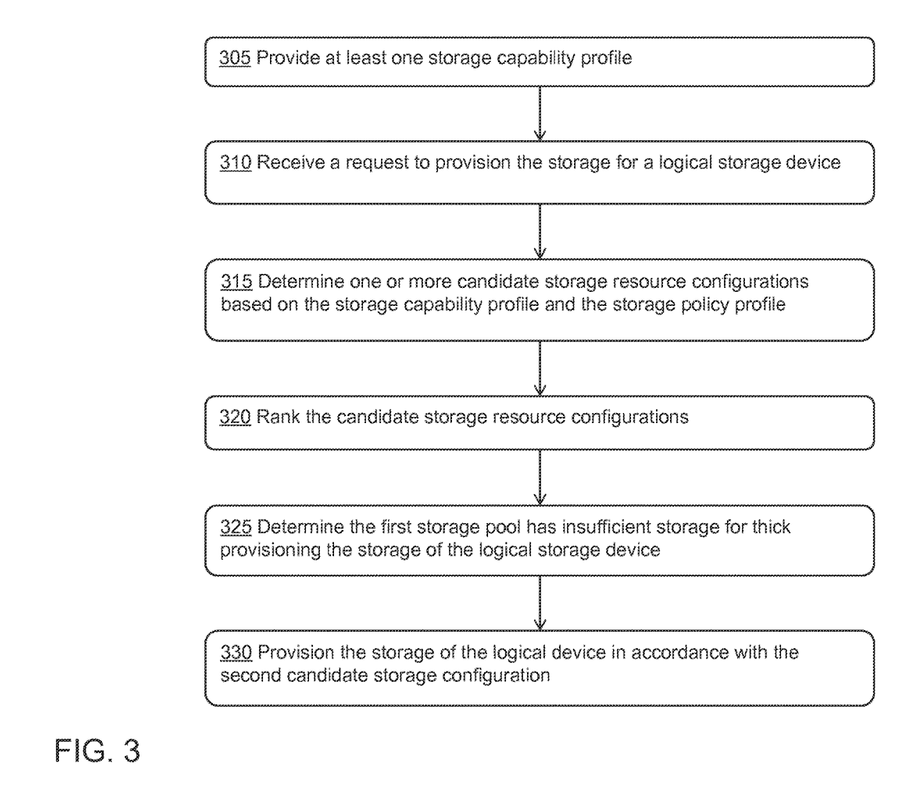
FIG. 3 depicts a flow chart illustrating a method of provisioning storage for a logical storage device in accordance with the technology.

The technology described herein can facilitate efficiently provisioning storage for a logical storage device (e.g., a virtual volume) based on a storage policy profile and one or more storage capability profiles. FIG. 3 depicts a flow chart illustrating a method of provisioning storage for a logical storage device in accordance with the technology. The method illustrated in FIG. 3 can be executed by, for example, storage system 115. At step 305, the storage system provides at least one storage capability profile. As described above, the storage capability profile can specify the supported storage resource configurations supported by a storage pool in the storage system.

At step 310, the storage system can receive a request to provision the storage for a logical storage device (e.g., a virtual volume). The request can be provided from a virtualization environment (e.g., a virtualization environment executing on host 105a or 105b). The request can include a storage policy profile specifying one or more requested storage resource configurations for the logical device, as described above.

At step 315, the storage system can determine one or more candidate storage resource configurations based on the storage capability profile (or multiple storage capability profiles) and the storage policy profile. For example, the storage system can determine a first candidate storage resource configuration that specifies thick provisioning in a first storage pool. The storage system can determine a second candidate storage resource configuration specifies thin provisioning in the first storage pool. In some embodiments, each of the candidate storage resource configurations include a space efficiency capability and an associated capability value that is thick provisioning or thin provisioning.

At step 320, the storage system can rank the candidate storage resource configurations. In the illustrated example, the ranking can indicate the first candidate storage resource configuration has a higher priority than the second candidate storage resource configuration. At step 325, the storage system can determine the first storage pool has insufficient storage for thick provisioning the storage of the logical storage device. In some embodiments, the storage system can determine the first storage pool has insufficient storage for thick provisioning the storage of the logical storage device by attempting to provision the storage of the logical device in accordance with the first candidate storage configuration. If provisioning fails, the storage system can determine that there is insufficient storage. At step 330, the storage system can provision the storage of the logical device in accordance with the second candidate storage configuration.

Figure 4:
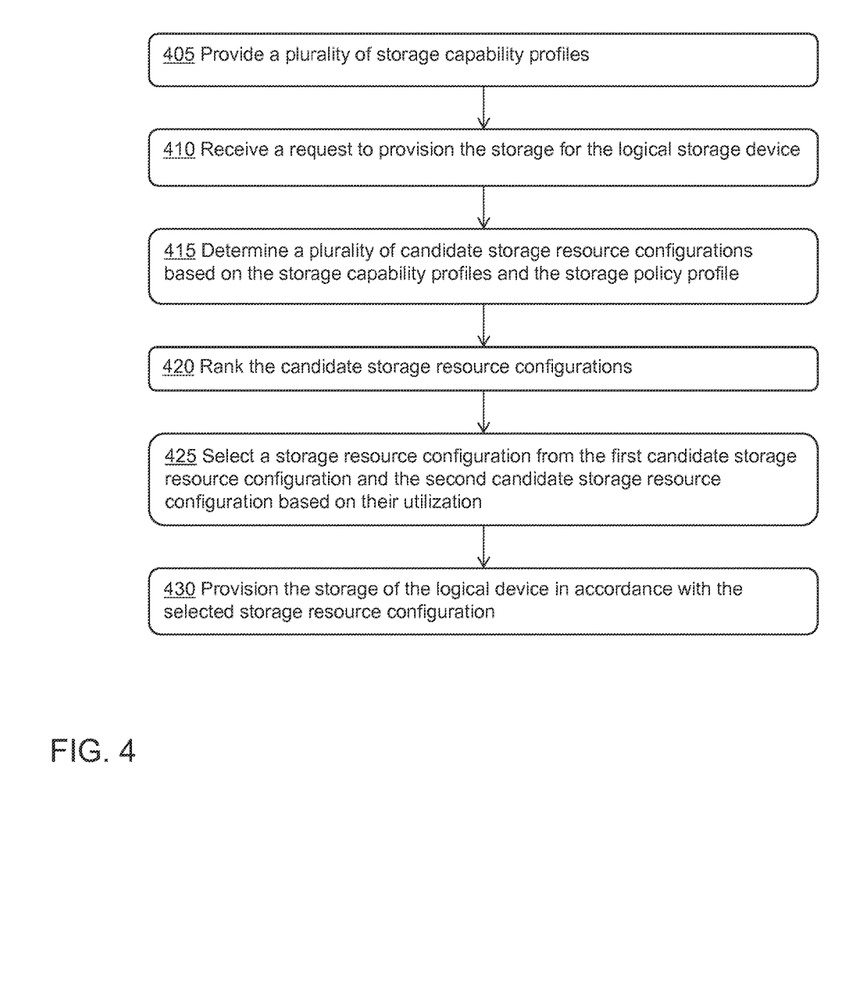
FIG. 4 depicts a flow chart illustrating a method of provisioning storage for a logical storage device in accordance with the technology.

FIG. 4 depicts a flow chart illustrating a method of provisioning storage for a logical storage device in accordance with the technology. The method illustrated in FIG. 4 can be executed by, for example, storage system 115. At step 405 the storage system can provide a plurality of storage capability profiles, with each storage capability profile specifying one or more supported storage resource configurations supported by a storage pool in the storage system. At step 410, the storage system can receive a request to provision the storage for the logical storage device. The request can include a storage policy profile specifying one or more requested storage resource configurations for the logical device.

At step 415, the storage system can determine a plurality of candidate storage resource configurations based on the plurality of storage capability profiles and the storage policy profile. For example, the storage system can determine a first candidate storage resource configuration that specifies provisioning in a first storage pool and a second candidate storage resource configuration that specifies provisioning in a second storage pool. At step 420, the storage system can rank the candidate storage resource configurations. The ranking can indicate the first candidate storage resource configuration has the same priority as the second candidate storage resource configuration. In some embodiments, the capabilities and associated capability values of the first candidate storage resource configuration are the same as the capabilities and associated capability values of the second candidate storage resource configuration (e.g., where the first storage pool and the second storage pool have similar storage devices and configurations).

At step 425, the storage system can select a storage resource configuration from the first candidate storage resource configuration and the second candidate storage resource configuration based on comparing their utilization. For example, in some embodiments, the storage system can determine the amount of available space in the first storage pool and the amount of available space in the second storage pool. The storage system can select the first candidate storage resource configuration if the first storage pool has more available space than the second storage pool. Otherwise, the storage system can select the second candidate storage resource configuration. In some embodiments, the storage system can determine the I/O load for the first storage pool and the I/O load for the second storage pool. The storage system can select the first candidate storage resource configuration if its I/O load is less than the second I/O load. Otherwise, the storage system can select the second candidate storage resource configuration. In some embodiments, the storage system can determine the utilization of the first storage pool based on the available space in the first storage pool and the I/O load for the first storage pool. The storage system can determine the utilization of the second storage pool based on the available space in the second storage pool and the I/O load for the second storage pool. The storage system can select the first candidate storage resource configuration if its utilization is less than the utilization of the second storage pool. Otherwise, the storage system can select the second candidate storage resource configuration. At step 430, the storage system can provision the storage of the logical device in accordance with the selected storage resource configuration.

Figure 5:
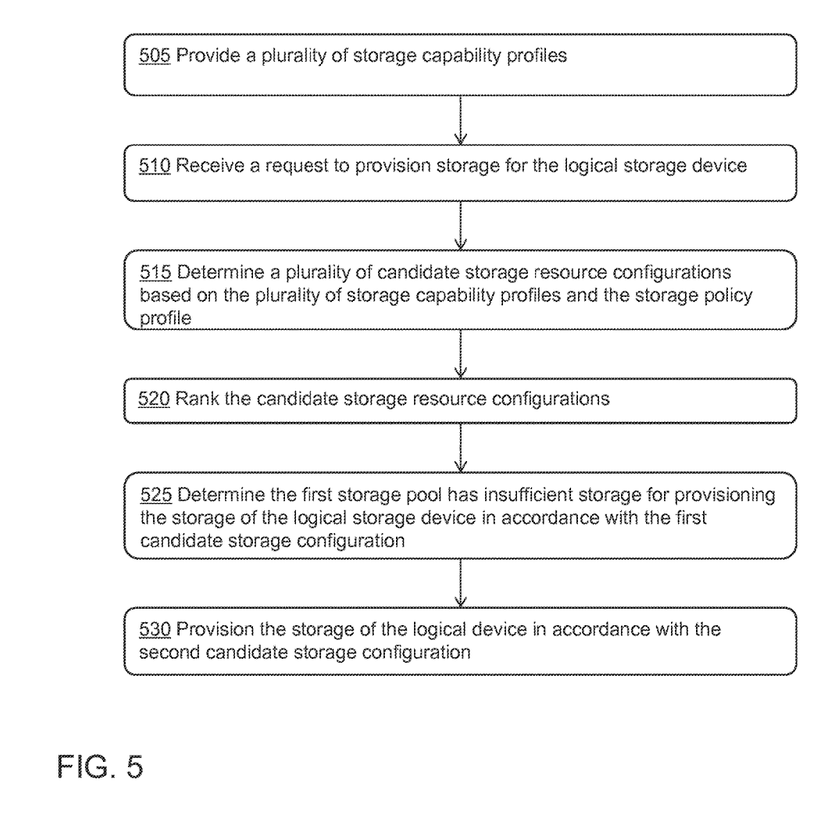
FIG. 5 depicts a flow chart illustrating a method of provisioning storage for a logical storage device in accordance with the technology.

FIG. 5 depicts a flow chart illustrating a method of provisioning storage for a logical storage device in accordance with the technology. The method illustrated in FIG. 5 can be executed by, for example, storage system 115. At step 505, the storage system can provide a plurality of storage capability profiles, each storage capability profile of the plurality of storage capability profiles specifying one or more supported storage resource configurations supported by a storage pool in the storage system. At step 510, the storage system can receive a request to provision storage for the logical storage device. The request can include a storage policy profile specifying one or more requested storage resource configurations for the logical device.

At step 515, the storage system can determine a plurality of candidate storage resource configurations based on the plurality of storage capability profiles and the storage policy profile. The storage system can determine a first candidate storage resource configuration that specifies provisioning in a first storage pool and a second candidate storage resource configuration that specifies provisioning in a second storage pool. In some embodiments, at least one of the plurality of capabilities and associated capability values of the first candidate storage resource configuration is different than at least one of the plurality of capabilities and associated capability values of the second candidate storage resource configuration.

At step 520, the storage system can rank the candidate storage resource configurations, the ranking indicating the first candidate storage resource configuration has a higher priority than the second candidate storage resource configuration. At step 525, the storage system can determine the first storage pool has insufficient storage for provisioning the storage of the logical storage device in accordance with the first candidate storage configuration. For example, the storage system can initiate provisioning the storage of the logical device in accordance with the first candidate storage configuration. The storage system can determine the provisioning of the storage of the logical device in accordance with the first candidate storage configuration fails. At step 530, the storage system can provision the storage of the logical device in accordance with the second candidate storage configuration.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A data storage system-implemented method of provisioning storage for a logical storage device comprising:
   providing, by the storage system, at least one storage capability profile, each storage capability profile of the at least one storage capability profile specifying one or more supported storage resource configurations supported by a storage pool in the storage system;
   receiving, by the storage system, a request to provision the storage for the logical storage device, the request comprising a storage policy profile specifying one or more requested storage resource configurations for the logical device;
   determining, by the storage system, a plurality of candidate storage resource configurations based on the at least one storage capability profile and the storage policy profile, wherein a first candidate storage resource configuration of the plurality of candidate storage resource configurations specifies thick provisioning in a first storage pool and a second candidate storage resource configuration specifies thin provisioning in the first storage pool;
   providing, by the storage system, a ranking of the plurality of candidate storage resource configurations, the ranking indicating the first candidate storage resource configuration has a higher priority than the second candidate storage resource configuration;
   determining, by the storage system, the first storage pool has insufficient storage for thick provisioning the storage of the logical storage device, wherein determining comprises:
      initiating, by the storage system, provisioning the storage of the logical device in accordance with the first candidate storage configuration; and
      determining, by the storage system, that the first storage pool has insufficient storage for thick provisioning the storage of the logical storage device if provisioning the storage of the logical device in accordance with the first candidate storage configuration fails; and
   provisioning, by the storage system, the storage of the logical device in accordance with the second candidate storage configuration in response to determining that the first storage pool has insufficient storage for thick provisioning the storage of the logical storage device.

2. The method of claim 1, wherein each candidate storage resource configuration of the plurality of candidate storage resource configurations comprises a plurality of capabilities and associated capability values.

3. The method of claim 2, wherein the plurality of capabilities comprises at least one of flash-based storage, drive type, RAID type, fast cache, fast VP, and space efficiency.

4. The method of claim 3, wherein each candidate storage resource configuration of the plurality of candidate storage resource configurations comprises a space efficiency capability and an associated capability value, wherein the associated capability value is thick provisioning or thin provisioning.

5. The method of claim 1, wherein the logical storage device is one of a configuration device, a swap device, or a data device used by a virtual machine.

6. A data storage system-implemented method of provisioning storage for a logical storage device comprising:
providing, by the storage system, a plurality of storage capability profiles, each storage capability profile of the plurality of storage capability profiles specifying one or more supported storage resource configurations supported by a storage pool in the storage system;
receiving, by the storage system, a request to provision the storage for the logical storage device, the request comprising a storage policy profile specifying one or more requested storage resource configurations for the logical device;
determining, by the storage system, a plurality of candidate storage resource configurations based on the plurality of storage capability profiles and the storage policy profile, wherein a first candidate storage resource configuration of the plurality of candidate storage resource configurations specifies provisioning in a first storage pool and a second candidate storage resource configuration of the plurality of candidate storage resource configurations specifies provisioning in a second storage pool;
providing, by the storage system, a ranking of the plurality of candidate storage resource configurations, the ranking indicating the first candidate storage resource configuration has the same priority as the second candidate storage resource configuration;
selecting, by the storage system, a selected storage resource configuration of the first candidate storage resource configuration and the second candidate storage resource configuration based on comparing a first utilization of the first storage pool to a second utilization of the second storage pool, wherein selecting comprises:
determining, by the storage system, a first I/O load for the first storage pool;
determining, by the storage system, a second I/O load for the second storage pool;
selecting, by the storage system, the first candidate storage resource configuration if the first I/O load is less than the second I/O load; and
selecting, by the storage system, the second candidate storage resource configuration if the first I/O load is not less than the second I/O load; and
provisioning, by the storage system, the storage of the logical device from one of the group consisting of the first storage pool and the second storage pool in accordance with the selected storage resource configuration.

7. The method of claim 6, wherein each candidate storage resource configuration of the plurality of candidate storage resource configurations comprises a plurality of capabilities and associated capability values.

8. The method of claim 7, wherein the plurality of capabilities comprises at least one of flash-based storage, drive type, RAID type, fast cache, fast VP, and space efficiency.

9. The method of claim 7, wherein the plurality of capabilities and associated capability values of the first candidate storage resource configuration are the same as the plurality of capabilities and associated capability values of the second candidate storage resource configuration.

10. The method of claim 6, wherein selecting the selected storage resource configuration of the first candidate storage resource configuration and the second candidate storage resource configuration based on comparing a first utilization of the first storage pool to a second utilization of the second storage pool comprises:
determining, by the storage system, a first available space in the first storage pool;
determining, by the storage system, a second available space in the second storage pool;
selecting, by the storage system, the first candidate storage resource configuration if the first available space is greater than the second available space; and
selecting, by the storage system, the second candidate storage resource configuration if the first available space is not greater than the second available space.

11. The method of claim 6, wherein selecting the selected storage resource configuration of the first candidate storage resource configuration and the second candidate storage resource configuration based on comparing a first utilization of the first storage pool to a second utilization of the second storage pool comprises:
determining, by the storage system, the first utilization based on a first available space in the first storage pool and a first I/O load for the first storage pool;
determining, by the storage system, the second utilization based on a second available space in the second storage pool and a second I/O load for the second storage pool;
selecting, by the storage system, the first candidate storage resource configuration if the first utilization is less than the second utilization; and
selecting, by the storage system, the second candidate storage resource configuration if the first utilization is not less than the second utilization.

12. The method of claim 6, wherein the logical storage device is one of a configuration device, a swap device, or a data device used by a virtual machine.

13. A data storage system-implemented method of provisioning storage for a logical storage device comprising:
providing, by the storage system, a plurality of storage capability profiles, each storage capability profile of the plurality of storage capability profiles specifying one or more supported storage resource configurations supported by a storage pool in the storage system;
receiving, by the storage system, a request to provision storage for the logical storage device, the request comprising a storage policy profile specifying one or more requested storage resource configurations for the logical device;
determining, by the storage system, a plurality of candidate storage resource configurations based on the plurality of storage capability profiles and the storage policy profile, wherein a first candidate storage resource configuration of the plurality of candidate storage resource configurations specifies provisioning in a first storage pool and a second candidate storage resource configuration of the plurality of candidate storage resource configurations specifies provisioning in a second storage pool;
providing, by the storage system, a ranking of the plurality of candidate storage resource configurations, the ranking indicating a first candidate storage resource configuration has a higher priority than the second candidate storage resource configuration;
determining, by the storage system, the first storage pool has insufficient storage for provisioning the storage of the logical storage device in accordance with the first candidate storage configuration, wherein determining comprises:

initiating, by the storage system, provisioning the storage of the logical device in accordance with the first candidate storage configuration; and determining, by the storage system, that the first storage pool has insufficient storage for thick provisioning the storage of the logical storage device if provisioning the storage of the logical device in accordance with the first candidate storage configuration fails; and provisioning, by the storage system, the storage of the logical device in accordance with the second candidate storage configuration in response to determining that the first storage pool has insufficient storage for thick provisioning the storage of the logical storage device.

14. The method of claim 13, wherein each candidate storage resource configuration of the plurality of candidate storage resource configurations comprises a plurality of capabilities and associated capability values.

15. The method of claim 14, wherein the plurality of capabilities comprises at least one of flash-based storage, drive type, RAID type, fast cache, fast VP, and space efficiency.

16. The method of claim 14, wherein at least one of the plurality of capabilities and associated capability values of the first candidate storage resource configuration is different than at least one of the plurality of capabilities and associated capability values of the second candidate storage resource configuration.

17. The method of claim 13, wherein the logical storage device is one of a configuration device, a swap device, or a data device used by a virtual machine.

* * * * *